(12) United States Patent
Wang et al.

(10) Patent No.: US 9,025,658 B2
(45) Date of Patent: May 5, 2015

(54) TRANSFORM SCHEME FOR VIDEO CODING

(75) Inventors: Wen-Shan Wang, Chandler, AZ (US); Hyung-Suk Kim, Valencia, CA (US)

(73) Assignee: Intel Corporation, Santa Clara, CA (US)

( * ) Notice: Subject to any disclaimer, the term of this patent is extended or adjusted under 35 U.S.C. 154(b) by 3138 days.

(21) Appl. No.: 11/026,343

(22) Filed: Dec. 30, 2004

(65) Prior Publication Data

US 2006/0146186 A1  Jul. 6, 2006

(51) Int. Cl.
*H04N 7/12* (2006.01)
*H04N 11/02* (2006.01)
*H04N 19/42* (2014.01)
*H04N 19/61* (2014.01)

(52) U.S. Cl.
CPC ............... *H04N 19/42* (2014.11); *H04N 19/61* (2014.11)

(58) Field of Classification Search
USPC .............................. 375/240–240.29; 348/441
See application file for complete search history.

(56) References Cited

U.S. PATENT DOCUMENTS 5,325,215 A * 6/1994 Shibata et al. ................. 358/479
5,764,553 A * 6/1998 Hong ............................ 708/400

* cited by examiner

*Primary Examiner* — Chikaodili E Anyikire
(74) *Attorney, Agent, or Firm* — Schwegman Lundberg & Woessner, P.A.; William E. Kalweit

(57) ABSTRACT

An embodiment includes a method that includes receiving a number of pixels of video data. The method also includes commencing a first arithmetic operation of a matrix of the number of pixels with a transpose of a constant matrix prior to a first element of the second row being received.

13 Claims, 11 Drawing Sheets

| Clock | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| A0 | $p_{00}$ | $p_{01}$ | $p_{02}$ | $p_{03}$ | $p_{10}$ | $p_{11}$ | $p_{12}$ | $p_{13}$ | $p_{20}$ | $p_{21}$ | $p_{22}$ | $p_{23}$ | $p_{30}$ | $p_{31}$ | $p_{32}$ | $p_{33}$ | | |
| A1 | $p_{00}$ | $p_{01}$ | $p_{02}$ | $p_{03}$ | $p_{10}$ | $p_{11}$ | $p_{12}$ | $p_{13}$ | $p_{20}$ | $p_{21}$ | $p_{22}$ | $p_{23}$ | $p_{30}$ | $p_{31}$ | $p_{32}$ | $p_{33}$ | | |
| A2 | | | | | | | | | | | | | | | | | | |
| A3 | | | | | | | | | | | | | | | | | | |
| A4 | | | | $a_1$ | $a_0$ | | | $a_1$ | $a_0$ | | | $a_1$ | $a_0$ | | | $a_1$ | $a_0$ | |
| A5 | | | | $a_1$ | $a_0$ | | | $a_1$ | $a_0$ | | | $a_1$ | $a_0$ | | | $a_1$ | $a_0$ | |
| A6 | | | | $s_1$ | $s_0$ | | | $s_1$ | $s_0$ | | | $s_1$ | $s_0$ | | | $s_1$ | $s_0$ | |
| A7 | | | | $s_1$ | $s_0$ | | | $s_1$ | $s_0$ | | | $s_1$ | $s_0$ | | | $s_1$ | $s_0$ | |
| Output | | | | | | $d_{0n}$ | | | | $d_{1n}$ | | | | $d_{2n}$ | | | | $d_{3n}$ |

FIG. 4

| Clock | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| Acc0 | p00 | p01 | p02 | p03 | p10 | p11 | p12 | p13 | p20 | p21 | p22 | p23 | p30 | p31 | p32 | p33 | |
| Acc1 | p00 | p01 | p02 | p03 | p10 | p11 | p12 | p13 | p20 | p21 | p22 | p23 | p30 | p31 | p32 | p33 | |
| Acc2 | p00 | p01 | p02 | p03 | p10 | p11 | p12 | p13 | p20 | p21 | p22 | p23 | p30 | p31 | p32 | p33 | |
| Acc3 | p00 | p01 | p02 | p03 | p10 | p11 | p12 | p13 | p20 | p21 | p22 | p23 | p30 | p31 | p32 | p33 | |
| OUTPUT | | | | | $d_{0n}$ | | | | $d_{1n}$ | | | | $d_{2n}$ | | | | $d_{3n}$ |

INPUT (left label for Acc0–Acc3 rows)

TRANSFORM SCHEME FOR VIDEO CODING

TECHNICAL FIELD

The application relates generally to data processing, and, more particularly, to video coding operations.

BACKGROUND

Digital television and video on Digital Video Disks (DVDs) are revolutionizing home entertainment. Such applications as well as others are using video compression technology. One standard for video compression is the Advanced Video Coding standard (either the H.264 of ITU-T (International Telecommunications Union, Telecommunications Sector VCEG (Video Coding Experts Group) or MPEG (Motion Picture Experts Group)-4, Part 10 of ISO (International Standardization Organization/IEC (International Electrotechnical Commission)). Performing video compression in accordance with the Advanced Video Coding standard may consume a large amount of processor bandwidth and data storage because of the number of operations involved therein. For example, the Advanced Video Coding standard includes a number of matrix multiplication operations.

BRIEF DESCRIPTION OF THE DRAWINGS

Embodiments of the invention may be best understood by referring to the following description and accompanying drawings which illustrate such embodiments. The numbering scheme for the Figures included herein are such that the leading number for a given reference number in a Figure is associated with the number of the Figure. For example, a system 100 can be located in FIG. 1. However, reference numbers are the same for those elements that are the same across different Figures. In the drawings:

FIG. 4 illustrates a table of the timing of the execution of a transform scheme for video coding by the set of adders shown in FIG. 3A, according to some embodiments of the invention.

FIG. 8 illustrates a table of the timing of the execution of a transform scheme for video coding by a part of the set of accumulators shown in FIG. 7, according to some embodiments of the invention.

DETAILED DESCRIPTION

Methods, apparatus and systems for a transform scheme for a video coding operation are described. In the following description, numerous specific details are set forth. However, it is understood that embodiments of the invention may be practiced without these specific details. In other instances, well-known circuits, structures and techniques have not been shown in detail in order not to obscure the understanding of this description.

Moreover, while described in reference to video coding, some embodiments may be used in conjunction with other types of coding (such as audio, other types of multimedia, etc.) Additionally, while described in reference to Advanced Video Coding (either the H.264 ITU-T VCEG or MPEG-4 Part 10 of the ISO/IEC), some embodiments may be used in conjunction with other video coding standard operations. Furthermore, some embodiments may be used for any other types of applications that include the matrix multiplications (as described herein). Embodiments are illustrated in reference to a 4×4 matrix. However, embodiments are not so limited, as matrices of other sizes (e.g., 2×2, etc.) may be incorporated therein.

System Description

Figure 1:
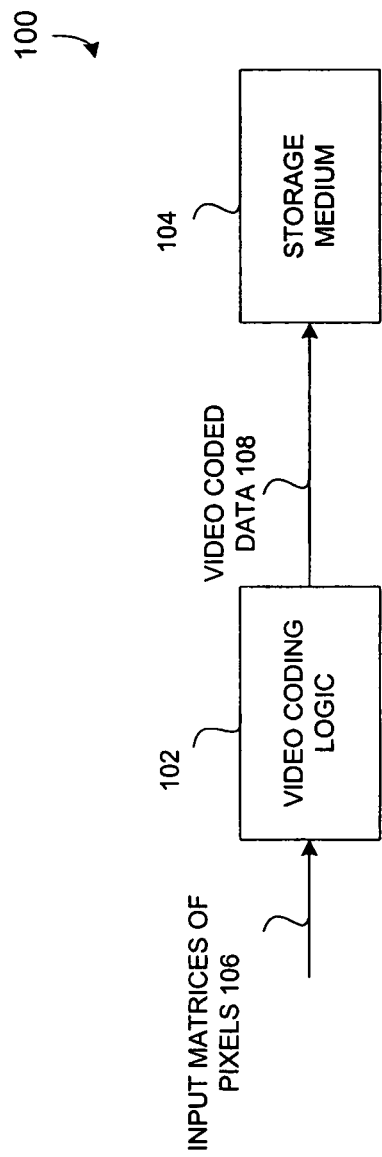
FIG. 1 illustrates a simplified block diagram of a system for a transform scheme for video coding, according to some embodiments of the invention.

FIG. 1 illustrates a simplified block diagram of a system for a transform scheme for video coding, according to some embodiments of the invention. FIG. 1 illustrates a system 100 that includes a video coding logic 102 coupled to receive input matrices of pixels 106. The video coding logic 102 may perform a video coding operation, in accordance with some embodiments of the invention, to output video coded data 108. The video coding logic 102 is coupled to input the video coded data 108 into a storage medium 104. In some embodiments, instead of storing the video coded data 108, the video coding logic 102 may transmit the video coded data 108 to a different logic for decoding thereof. For example, the video coded data 108 may be transmitted over a network and decoded upon receipt.

In some embodiments, the video coding logic 102 may perform the video coding operation based on the Advanced Video Coding standard (either the H.264 ITU-T VCEG or MPEG-4 Part 10 of the ISO/IEC). For more information regarding various H.264 ITU-T VCEG, please refer to "ITU-T Rec. H.264/ISO/IEC 11496-10, "Advanced Video Coding", Final Committee Draft, Document JVT-E022, September, 2002" and related amendments. For more information regarding various MPEG-4 Part 10 of the ISO/IEC, please refer to "ISO/IEC 14496-10: 2003 Information Technology—Coding of Audio-Visual Objects—Part 10: Advanced Video Coding" and related amendments.

In some embodiments, the Advanced Video Coding standard uses a number of transforms. For example, the Advanced Video Coding standard may perform the transform for a 4×4 array of luma Discrete Cosine (DC) coefficients in intra macroblocks; the transform for a 2×2 array of chroma DC coefficients; or the transform for other 4×4 array in the residual data.

Embodiments are now described in reference to the transform for a 4×4 matrix of residual data. Equation (1) illustrates the equation used for such a transformation:

$$C = APA^T = \begin{bmatrix} 1 & 1 & 1 & 1 \\ 2 & 1 & -1 & -2 \\ 1 & -1 & -1 & 1 \\ 1 & -2 & 2 & -1 \end{bmatrix} \begin{bmatrix} p_{00} & p_{01} & p_{02} & p_{03} \\ p_{10} & p_{11} & p_{12} & p_{13} \\ p_{20} & p_{21} & p_{22} & p_{23} \\ p_{30} & p_{31} & p_{32} & p_{33} \end{bmatrix} \quad (1)$$

$$\begin{bmatrix} 1 & 2 & 1 & 1 \\ 1 & 1 & -1 & -2 \\ 1 & -1 & -1 & 2 \\ 1 & -2 & 1 & -1 \end{bmatrix}$$

where, $$C = \begin{bmatrix} c_{00} & c_{01} & c_{02} & c_{03} \\ c_{10} & c_{11} & c_{12} & c_{13} \\ c_{20} & c_{21} & c_{22} & c_{23} \\ c_{30} & c_{31} & c_{32} & c_{33} \end{bmatrix},$$

$$A = \begin{bmatrix} 1 & 1 & 1 & 1 \\ 2 & 1 & -1 & -2 \\ 1 & -1 & -1 & 1 \\ 1 & -2 & 2 & -1 \end{bmatrix}, \text{ and } P = \begin{bmatrix} p_{00} & p_{01} & p_{02} & p_{03} \\ p_{10} & p_{11} & p_{12} & p_{13} \\ p_{20} & p_{21} & p_{22} & p_{23} \\ p_{30} & p_{31} & p_{32} & p_{33} \end{bmatrix}$$

P is the input matrix. C is the output matrix. A and $A^T$ are the constant matrix and the transpose of the constant matrix, respectively. Equation (1) includes two different matrix multiplications. Assume that the product of AP is a matrix B, then the output matrix (C) is as follows:

$$C = APA^T = BA^T = \begin{bmatrix} b_{00} & b_{01} & b_{02} & b_{03} \\ b_{10} & b_{11} & b_{12} & b_{13} \\ b_{20} & b_{21} & b_{22} & b_{23} \\ b_{30} & b_{31} & b_{32} & b_{33} \end{bmatrix} \begin{bmatrix} 1 & 2 & 1 & 1 \\ 1 & 1 & -1 & -2 \\ 1 & -1 & -1 & 2 \\ 1 & -2 & 2 & -1 \end{bmatrix} \quad (2)$$

Where, $$B = \begin{bmatrix} p_{00}+p_{10}+p_{20}+p_{30} & p_{01}+p_{11}+p_{21}+p_{31} & p_{02}+p_{12}+p_{22}+p_{32} & p_{03}+p_{13}+p_{23}+p_{33} \\ 2p_{00}+p_{10}-p_{20}-2p_{30} & 2p_{01}+p_{11}-p_{21}-2p_{31} & 2p_{02}+p_{12}-p_{22}-2p_{32} & 2p_{03}+p_{13}-p_{23}-2p_{33} \\ p_{00}-p_{10}-p_{20}+p_{30} & p_{01}-p_{11}-p_{21}+p_{31} & p_{02}-p_{12}-p_{22}+p_{32} & p_{03}-p_{13}-p_{23}+p_{33} \\ p_{00}-2p_{10}+2p_{20}-p_{30} & p_{01}-2p_{11}+2p_{21}-p_{31} & p_{02}-2p_{12}+2p_{22}-p_{32} & p_{03}-2p_{13}+2p_{23}-p_{33} \end{bmatrix}$$

In some embodiments, the pixels of the input matrices of pixels 106 are received in a raster scan order (starting from left to right and top to bottom). If the raster scan order is used, the video coding logic 102 does not receive the first member of the matrix B, $b_{00}$ until the $13^{th}$ input, $p_{30}$. In other words, the video coding logic 102 may not commence execution for members of the B matrix until at least the first element in the last row of the input matrix. In particular, each of the elements of the B matrix needs an element from the last row of the input matrix. For example, the first element of the B matrix is based on the following equation (shown above):

$p_{00}+p_{10}+p_{20}+p_{30}$.

In some embodiments, the video coding logic 102 may reverse the order of the matrix multiplications to allow for faster execution of the video coding operations. In particular, according to the associative property of matrix multiplication, the following equations are equal:

$$APA^T = (AP)A^T = A(PA^T) \quad (3)$$

Therefore, in some embodiments, the video coding logic 102 may first perform the matrix multiplication of the input matrix (P) by the transpose of the constant matrix ($A^T$). The video coding logic 102 may then perform the matrix multiplication of that result by the constant matrix (A). As further described below, such a switch in the matrix multiplications may allow the video coding operations to be executed faster.

Assume matrix D is the product of matrix multiplication $PA^T$, then $$C = APA^T = AD = \begin{bmatrix} 1 & 1 & 1 & 1 \\ 2 & 1 & -1 & -2 \\ 1 & -1 & -1 & 1 \\ 1 & -2 & 2 & -1 \end{bmatrix} \begin{bmatrix} d_{00} & d_{01} & d_{02} & d_{03} \\ d_{10} & d_{11} & d_{12} & d_{13} \\ d_{20} & d_{21} & d_{22} & d_{23} \\ d_{30} & d_{31} & d_{32} & d_{33} \end{bmatrix} \quad (4)$$

Where, $$D = \begin{bmatrix} p_{00}+p_{01}+p_{02}+p_{03} & 2p_{00}+p_{01}-p_{02}-2p_{03} & p_{00}-p_{01}-p_{02}+p_{03} & p_{00}-2p_{01}+2p_{02}-p_{03} \\ p_{10}+p_{11}+p_{12}+p_{13} & 2p_{10}+p_{11}-p_{12}-2p_{13} & p_{10}-p_{11}-p_{12}+p_{13} & p_{10}-2p_{11}+2p_{12}-p_{13} \\ p_{20}+p_{21}+p_{22}+p_{23} & 2p_{20}+p_{21}-p_{22}-2p_{23} & p_{20}-p_{21}-p_{22}+p_{23} & p_{20}-2p_{21}+2p_{22}-p_{23} \\ p_{30}+p_{31}+p_{32}+p_{33} & 2p_{30}+p_{31}-p_{32}-2p_{33} & p_{30}-p_{31}-p_{32}+p_{33} & p_{30}-2p_{31}+2p_{32}-p_{33} \end{bmatrix}$$

$$C = \begin{bmatrix} d_{00}+d_{10}+d_{20}+d_{30} & d_{01}+d_{11}+d_{21}+d_{31} & d_{02}+d_{12}+d_{22}+d_{32} & d_{03}+d_{13}+d_{23}+d_{33} \\ 2d_{00}+d_{10}-d_{20}-2d_{30} & 2d_{01}+d_{11}-d_{21}-2d_{31} & 2d_{02}+d_{12}-d_{22}-2d_{32} & 2d_{03}+d_{13}-d_{23}-2d_{33} \\ d_{00}-d_{10}-d_{20}+d_{30} & d_{01}-d_{11}-d_{21}+d_{31} & d_{02}-d_{12}-d_{22}+d_{32} & d_{03}-d_{13}-d_{23}+d_{33} \\ d_{00}-2d_{10}+2d_{20}-d_{30} & d_{01}-2d_{11}+2d_{21}-d_{31} & d_{02}-2d_{12}+2d_{22}-d_{32} & d_{03}-2d_{13}+2d_{23}-d_{33} \end{bmatrix}$$

As shown, the video coding logic 102 may acquire the first member of matrix D, $d_{00}$, after the $4^{th}$ input, $p_{03}$ has been inputted therein. Therefore, switching the order of the matrix multiplications, the video coding logic 102 is not required to receive the $13^{th}$ input of the input matrix prior to commencing the matrix multiplication operation. Rather, the video coding logic 102 may commence its matrix multiplication after receiving the fourth input, $p_{03}$. In other words, the video coding logic 102 may commence its matrix multiplication prior to receiving an element of the second row of the input matrix. See the intermediate result (matrix D), wherein the first element ($p_{00}+p_{01}+p_{02}+p_{03}$) may be computed after receipt of the last element in the first row ($p_{03}$). In contrast, if the matrix multiplication of the input matrix by the constant matrix were first performed, the video coding logic 102 may not commence its matrix multiplication until after receiving the $13^{th}$ input ($p_{30}$). See the intermediate result (matrix B) (equation 2 above), wherein calculation of any of the elements therein requires a pixel from the fourth row ($p_{30}$, $p_{31}$, $p_{32}$ or $p_{33}$). For example, the first element of matrix B includes ($p_{00}+p_{10}+p_{20}+p_{30}$).

Moreover, as shown, in some embodiments, the absolute values of the members of the constant matrix (A) and the transpose ($A^T$) thereof are either one or two. Therefore, in some embodiments, the video coding logic 102 does not include a multiplier (either hardware or software) and/or does not perform a multiplication of the individual elements. The video coding logic 102 may perform the "two times" operation using a shift operation (shift-left-by-one operation).

Various embodiments of the video coding operation by the video coding logic 102 are now described in more detail. In particular, two schemes for performing the transform as part of the video coding operations are described. A first transform scheme includes two sets of logic with an intermediate buffer in between. A second transform scheme includes a logic without an intermediate buffer. As further described below, some embodiments allow for faster execution relative to conventional approaches. Some embodiments receive an input matrix of pixels in a raster scan order. In comparison to conventional approaches, some embodiments are configured to commence processing of such pixels at an earlier point of the input of such pixels. Moreover, some embodiments avoid the need for an intermediate buffer. Accordingly, some embodiments may allow for faster execution because of the elimination of input/output accesses for such an intermediate buffer.

Transform Scheme With an Intermediate Buffer

Figure 2:
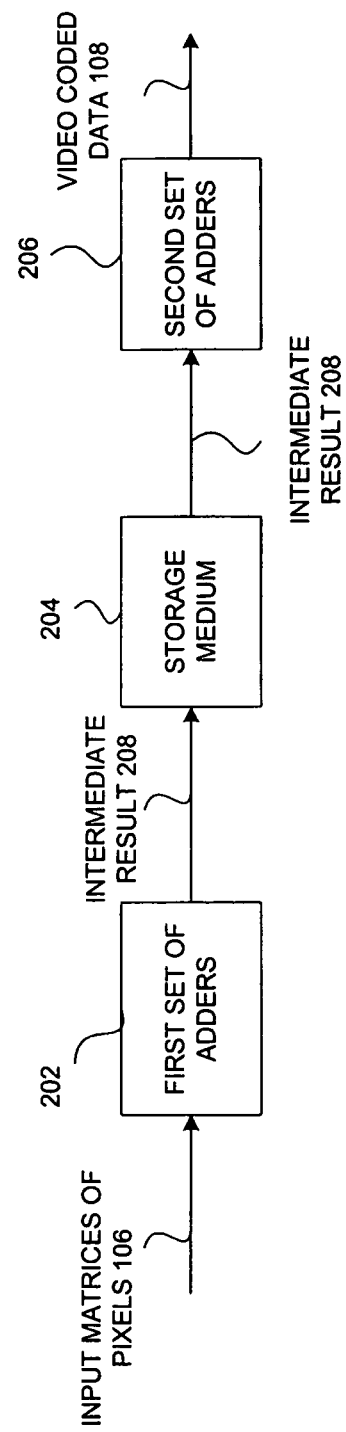
FIG. 2 illustrates a block diagram of a video coding logic and a data store for a transform scheme for video coding, according to some embodiments of the invention.

Various embodiments of the video coding operation are now described. FIG. 2 illustrates a block diagram of a video coding logic and a data store for a transform scheme for video coding, according to some embodiments of the invention. In particular, FIG. 2 illustrates a more detailed block diagram of the video coding logic 102 along with a storage medium, according to some embodiments of the invention. The video coding logic 102 may include the first set of adders 202 and a second set of adders 206.

A storage medium 204 may be different types of machine-readable medium. For example, the storage medium 204 may be volatile media (e.g., random access memory (RAM), magnetic disk storage media, optical storage media, flash memory devices, etc.).

The first set of adders 202 is coupled to receive the input matrices of pixels 106. The first set of adders 202 may perform a first video coding operation and generate an intermediate result 208. The first set of adders 202 may store the intermediate result 208 into the storage medium 204. The second set of adders 206 may retrieve the intermediate result 208 and perform a second video coding operation. The result of second video coding operation is the video coded data 108, which is output from the second set of adders 206. A more detailed description of the video coding operation performed by the video coding logic 102 is set forth below.

Figure 3A:
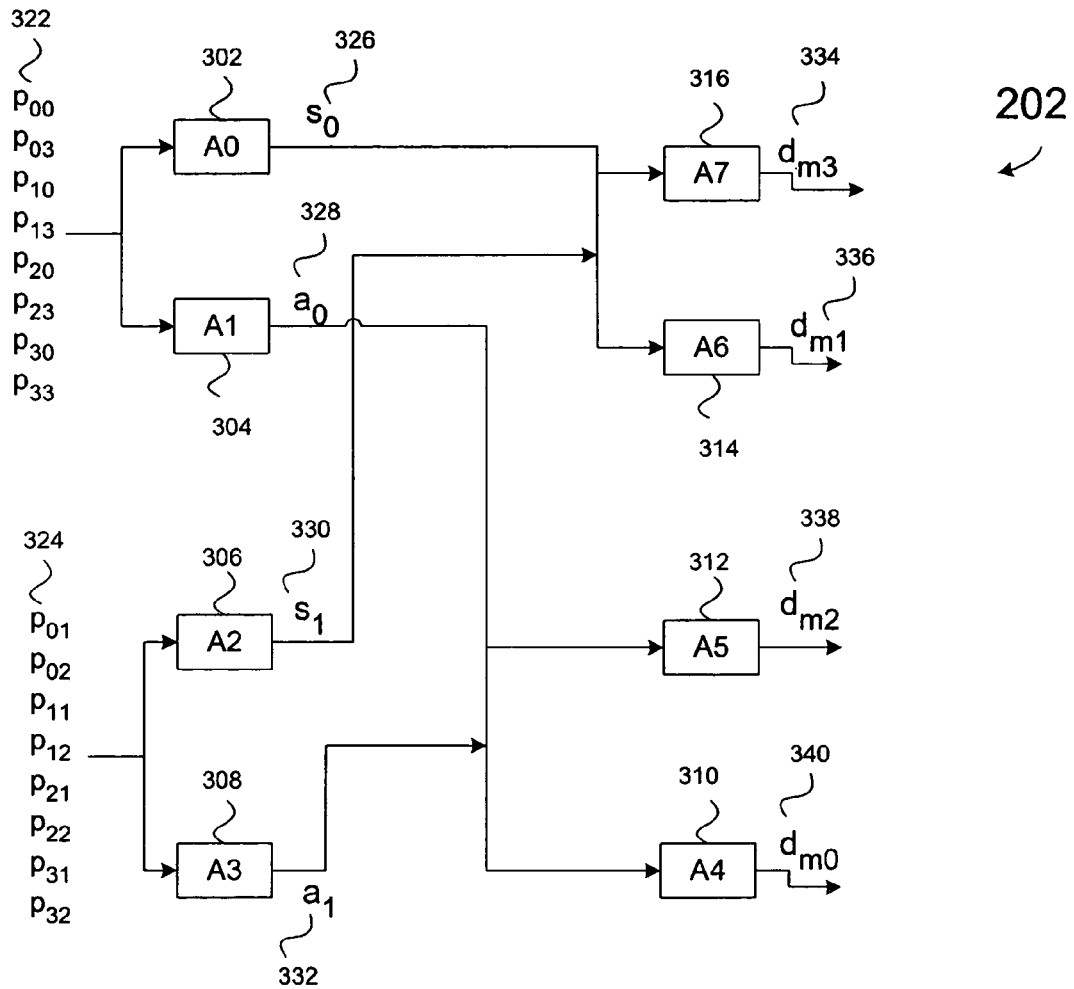
FIGS. 3A-3B illustrate a set of adders for a transform scheme for video coding, according to some embodiments of the invention.
Figure 3B:
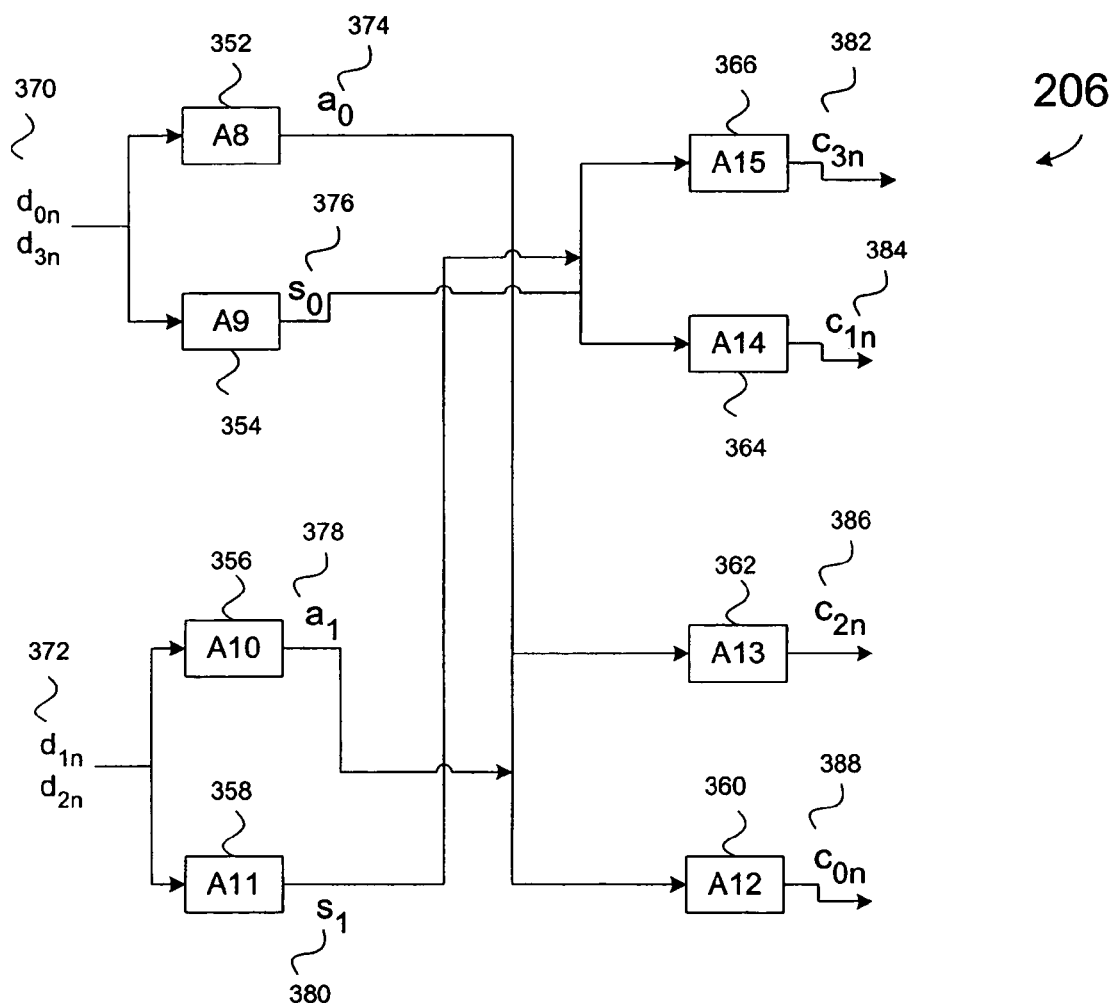

FIGS. 3A-3B illustrate a set of adders for a transform scheme for video coding, according to some embodiments of the invention. FIG. 3A and FIG. 3B illustrate the first set of adders 202 and the second set of adders 206, respectively. FIGS. 3A-3B illustrate the set of adders in accordance with equation (4) (shown above). In particular, FIGS. 3A-3B illustrate first performing the matrix multiplication of the input matrix (P) by the transpose of the constant matrix ($A^T$), which is followed by performing the matrix multiplication of that result by the constant matrix (A). FIG. 3A and FIG. 3B illustrate logic configurations for performing a first stage (D=$PA^T$) and a second stage (C=DA), respectively.

Equation set (5) includes those equations to compute the mth row of matrix D.

$$a_0=p_{m0}+p_{m3} \; a_1=p_{m1}+p_{m2} \; s_0=p_{m0}-p_{m3} \; s_1= p_{m1}-p_{m2} \; d_{m0}=a_0+a_1 \; d_{m1}=2s_0+s_1 \; d_{m2}= a_0-a_1 \; d_{m3}=s_0-2s_1 \quad (5)$$

The $a_0$, $a_1$, $s_0$ and $s_1$ represent the intermediate data and may be used for the different rows of the matrix D. For example, if m=0, the first row of the matrix is computed; if m=1, the second row of the matrix is computed, etc. As shown by equation set (5), eight additions are performed to generate one row of the product matrix.

Referring to FIG. 3A, the first set of adders 202 includes adders ($A_0$ 302, $A_1$ 304, $A_2$ 306, $A_3$ 308, $A_4$ 310, $A_5$ 312, $A_6$ 314 and $A_7$ 316). The adder $A_0$ 302 and the adder $A_1$ 304 are coupled to receive the following pixels ($p_{00}$, $p_{03}$, $p_{10}$, $p_{13}$, $p_{20}$, $p_{23}$, $p_{30}$ and $p_{33}$) from the current input matrix (input matrices of pixels 106). The adder $A_2$ 306 and the adder $A_3$ 308 are coupled to receive the following pixels ($p_{01}$, $p_{02}$, $p_{11}$, $p_{12}$, $p_{21}$, $p_{22}$, $p_{31}$ and $p_{32}$) from the current input matrix (input matrices of pixels 106).

The output from the adder $A_0$ 302 is an output 326, which is $s_0$. The output from the adder $A_1$ 304 is an output 328, which is $a_0$. The output from the adder $A_2$ 306 is an output 330, which is $s_1$. The output from the adder $A_3$ 308 is an output 332, which is $a_1$.

The output 326 ($s_0$) is input into the adder $A_7$ 316 and the adder $A_6$ 314. The output 328 ($a_0$) is input into the adder $A_4$ 310 and the adder $A_5$ 312. The output 330 ($s_1$) is input into the adder $A_7$ 316 and the adder $A_6$ 314. The output 332 ($a_1$) is input into the adder $A_4$ 310 and the adder $A_5$ 312.

The output from the adder $A_7$ 316 is an output 334, which is $d_{m3}$ ($s_0-2s_1$). The output from the adder $A_6$ 314 is an output 336, which is $d_{m1}$ ($2s_0+s_1$). The output from the adder $A_5$ 312 is an output 338, which is $d_{m2}$ ($a_0-a_1$). The output from the adder $A_4$ 310 is an output 340, which is $d_{m0}$ ($a_0+a_1$).

FIG. 4 illustrates a table of the timing of the execution of a transform scheme for video coding by the set of adders shown in FIG. 3A, according to some embodiments of the invention. Data input may be performed in one clock cycle. The addition operations (including shifting and signing) may also be performed in one clock cycle. As shown, the first set of adders 202 may output a first row of the D matrix, the $d_{0n}$, which includes $d_{00}$, $d_{01}$, $d_{02}$ and $d_{03}$, in six clock cycles. Assuming that the pipeline is available, the first set of adders 202 may output four rows of the D matrix in 18 clock cycles.

Referring to FIG. 3B, the second stage of the matrix multiplication is now described. As shown, the output from the first set of adders 202 is input into the second set of adders 206. The output from the second set of adders 206 are the elements of the C matrix.

Equation set (6) includes those equations to compute the nth column of matrix C.

$$a_0=d_{0n}+d_{3n} \; a_1=d_{1n}+d_{2n} \; s_0=d_{0n}-d_{3n} \; s_1=d_{1n}- d_{2n} \; c_{0n}=a_0+a_1 \; c_{1n}=2s_0+s_1 \; c_{2n}=a_0-a_1 \; c_{3n}=s_0-2s_1 \quad (6)$$

The $a_0$, $a_1$, $s_0$ and $s_1$ represent intermediate data and may be used for the different columns of the matrix D. As shown by equation set (6), eight additions are performed to generate one column of the product matrix.

The second set of adders 206 includes adders ($A_8$ 352, $A_9$ 354, $A_{10}$ 356, $A_{11}$ 358, $A_{12}$ 360, $A_{13}$ 362, $A_{14}$ 364 and $A_{15}$ 366). The adder $A_8$ 352 and the adder $A_9$ 354 are coupled to receive inputs 370, which are $d_{0n}$ and $d_{3n}$. The adder $A_{10}$ 356 and the adder $A_{11}$ 358 are coupled to receive inputs 372, which are $d_{1n}$ and $d_{2n}$.

The output from the adder $A_8$ 352 is an output 374, which is $a_0$ ($d_{0n}+d_{3n}$). The output from the adder $A_9$ 354 is an output 376, which is $s_0$ ($d_{0n}-d_{3n}$). The output from the adder $A_{10}$ 356 is an output 378, which is $a_1$ ($d_{1n}+d_{2n}$). The output from the adder $A_{11}$ 358 is an output 380, which is $s_1$ ($d_{1n}-d_{2n}$).

The output 374 ($a_0$) is input into the adder $A_{13}$ 362 and the adder $A_{12}$ 360. The output 376 ($s_0$) is input into the adder $A_{14}$ 364 and the adder $A_{15}$ 366. The output 378 ($a_1$) is input into the adder $A_{13}$ 362 and the adder $A_{12}$ 360. The output 380 ($s_1$) is input into the adder $A_{14}$ 364 and the adder $A_{15}$ 366.

The output from the adder $A_{15}$ 366 is an output 382, which is $c_{3n}$ ($s_0-2s_1$). The output from the adder $A_{14}$ 364 is an output 384, which is $c_{1n}$ ($2s_0+s_1$). The output from the adder $A_{13}$ 362 is an output 386, which is $c_{2n}$ ($a_0-a_1$). The output from the adder $A_{12}$ 360 is an output 388, which is $c_{0n}$ ($a_0+a_1$).

Figure 5:
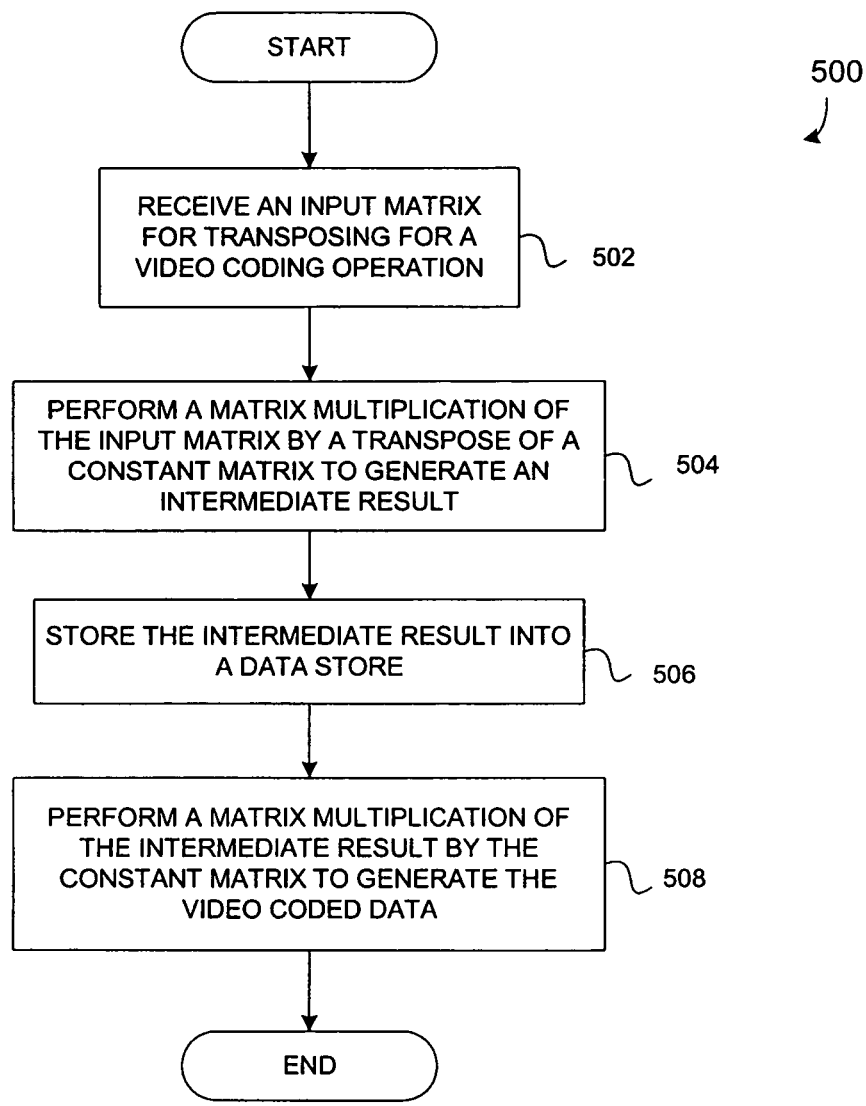
FIG. 5 illustrates a flow diagram for performing a transform scheme with a buffer for video coding, according to some embodiments of the invention.

FIG. 5 illustrates a flow diagram for performing a transform scheme with a buffer for video coding, according to some embodiments of the invention. The flow diagram 500 is described with reference to FIGS. 2-3. The flow diagram 500 commences at block 502.

At block 502, the video coding logic 102 receives an input matrix for transposing for a video coding operation. With reference to FIG. 2, the first set of adders 202 receives one of the input matrices of pixels 106. The adders ($A_0$ 302, $A_1$ 304, $A_2$ 306 and $A_3$ 308) receive the pixels (as shown in FIG. 3A). In some embodiments, the pixels are received in a raster scan order. The flow continues at block 504.

At block 504, the video coding logic 102 performs a matrix multiplication of the input matrix by the transpose of a constant matrix to generate an intermediate result. As shown by equation (1) above, the video coding operation includes a matrix multiplication of the input matrix by a constant matrix (A) and by the transpose of the constant matrix ($A^T$). The video coding logic 102 first performs the multiplication of the input matrix by the transpose of the constant matrix because the order of input. As described above, the video coding logic 102 may commence its matrix multiplication after receiving the fourth input, $p_{03}$. With reference to FIG. 3A, the video coding logic 102 may generate the elements of the D matrix using the adders ($A_0$ 302, $A_1$ 304, $A_2$ 306, $A_3$ 308, $A_4$ 310, $A_5$ 312, $A_6$ 314 and $A_7$ 316). The adders ($A_0$ 302, $A_1$ 304, $A_2$ 306, $A_3$ 308) may generate, respectively, the output 326 ($s_0$), the output 328 ($a_0$), the output 330 ($s_1$) and the output 332 ($a_1$) based on the equations in equation set (5). The adders ($A_4$ 310, $A_5$ 312, $A_6$ 314 and $A_7$ 316) may generate, respectively, the output 340 ($d_{m0}$), the output 338 ($d_{m2}$), the output 336 ($d_{m1}$) and the output 334 ($d_{m3}$) based on the equations in equation set (5). The flow continues at block 506.

At block 506, the video coding logic 102 stores the intermediate result into the storage medium 204. In particular, the video coding logic 102 stores the D matrix into the storage medium 204. The flow continues at block 508.

At block 508, the video coding logic 102 performs a matrix multiplication of the intermediate result by the constant matrix to generate the video coded data. With reference to FIG. 2, the second set of adders 206 may retrieve the intermediate result (the D matrix) from the storage medium 204. The second set of adders 206 may perform a matrix multiplication of the D matrix by the constant matrix A (using the equation set 6 shown above). With reference to FIG. 3B, the video coding logic 102 may generate the elements of the C matrix using the adders ($A_8$ 352, $A_9$ 354, $A_{10}$ 356, $A_{11}$ 358, $A_{12}$ 360, $A_{13}$ 362, $A_{14}$ 364 and $A_{15}$ 366).

The adders ($A_8$ 352, $A_9$ 354, $A_{10}$ 356, $A_{11}$ 358) may generate, respectively, the output 374 ($a_0$), the output 376 ($s_0$), the output 378 ($a_1$) and the output 380 ($s_1$) based on the equations in equation set (6). The adders ($A_{12}$ 360, $A_{13}$ 362, $A_{14}$ 364 and $A_{15}$ 366) may generate, respectively, the output 388 ($c_{0n}$), the output 386 ($c_{2n}$), the output 384 ($c_{1n}$) and the output 382 ($c_{3n}$) based on the equations in equation set (6). Accordingly, the C matrix is the video coded data 108.

Transform Scheme Without an Intermediate Data Buffer

Figure 6:
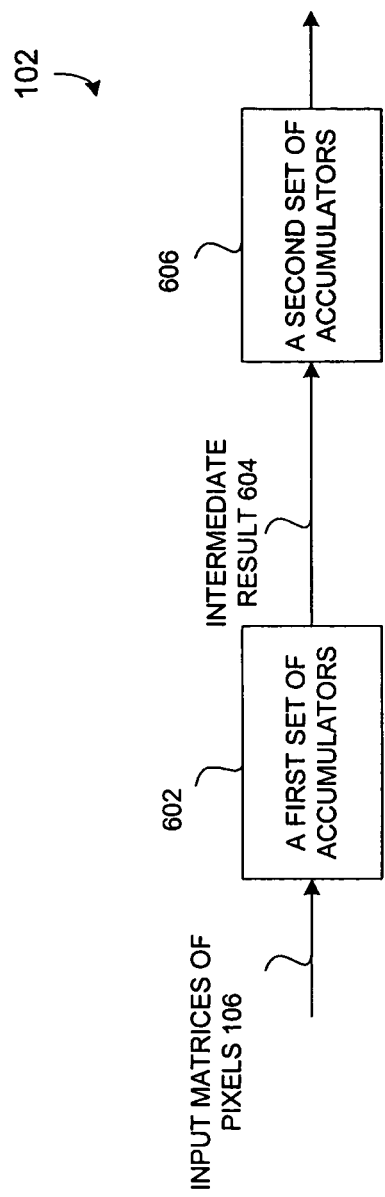
FIG. 6 illustrates a block diagram of a video coding logic for a transform scheme for video coding, according to some other embodiments of the invention.

FIG. 6 illustrates a block diagram of a video coding logic for a transform scheme for video coding, according to some other embodiments of the invention. In particular, FIG. 6 illustrates a more detailed block diagram of the video coding logic 102, according to some embodiments of the invention. The video coding logic 102 may include a first set of accumulators 602 and a second set of accumulators 606. In contrast to the configuration of FIG. 2, the video coding logic 102 does not include a storage medium for storing the intermediate result.

The first set of accumulators 602 is coupled to receive the input matrices of pixels 106. The first set of accumulators 602 may perform a first video coding operation and generate an intermediate result 604. The second set of accumulators 606 may be coupled to receive the intermediate result 604 directly from the first set of accumulators 602. The second set of accumulators 606 may perform a second video coding operation. The result of second video coding operation is the video coded data 108, which is output from the second set of accumulators 606. A more detailed description of the video coding operation performed by the video coding logic 102 is set forth below.

Figure 7:
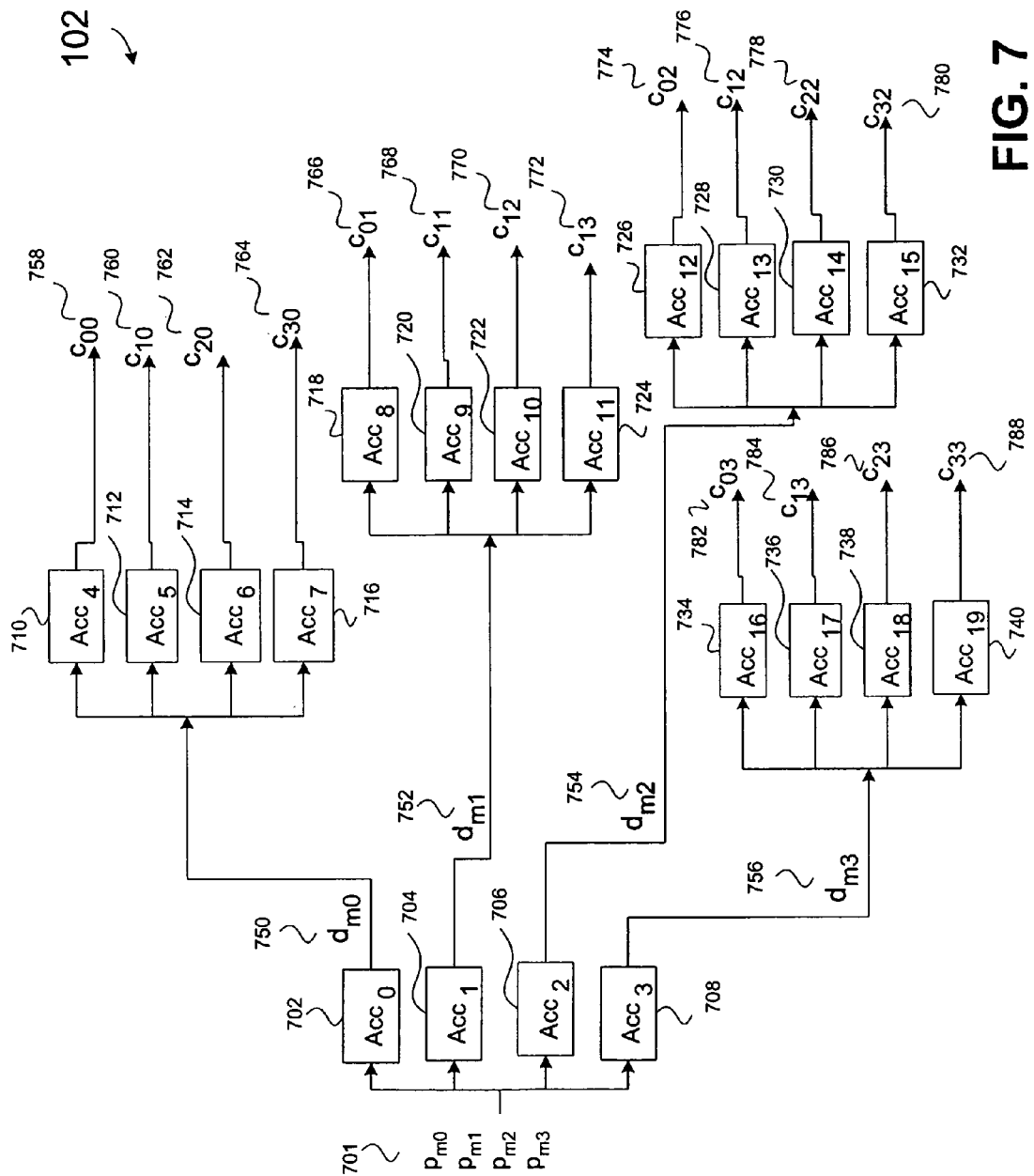
FIG. 7 illustrates a set of accumulators for a transform scheme for video coding, according to some embodiments of the invention.

FIG. 7 illustrates a set of accumulators for a transform scheme for video coding, according to some embodiments of the invention. In particular, FIG. 7 illustrates the video coding logic 102, according to some embodiments of the invention. With reference to FIG. 6, FIG. 7 illustrates a more detailed description of the first set of accumulators 602 and the second set of accumulators 606. The accumulators may accumulate, shift and sign the received data.

Equation set (7) includes those equations to compute the mth row of the D matrix.

$$d_{n0}=p_{m0}+p_{m1}+p_{m2}+p_{m3} \; d_{m1}=2p_{m0}+p_{m1}-p_{m2}-2p_{m3} \; d_{m2}=p_{m0}-p_{m1}-p_{m2}+p_{m3} \; d_{m3}=p_{m0}-2p_{m1}+2p_{m2}-p_{m3} \quad (7)$$

Equation set (8) includes those equations to compute the nth column of matrix C.

$$c_{0n}=d_{0n}+d_{1n}+d_{2n}+d_{3n} \; c_{2n}=d_{0n}+d_{3n}-d_{1n}-d_{2n} \; c_{1n}=2d_{0n}+d_{1n}-d_{2n}-2d_{3n} \; c_{3n}=d_{0n}-2d_{1n}+2d_{2n}-d_{3n} \quad (8)$$

Referring to FIG. 7, the video coding logic 102 includes accumulators ($Acc_0$ 702, $Acc_1$ 704, $Acc_2$ 706, $Acc_3$ 708, $Acc_4$ 710, $Acc_5$ 712, $Acc_6$ 714, $Acc_7$ 716, $Acc_8$ 718, $Acc_9$ 720, $Acc_{10}$ 722, $Acc_{11}$ 724, $Acc_{12}$ 726, $Acc_{13}$ 728, $Acc_{14}$ 730, $Acc_{15}$ 732, $Acc_{16}$ 734, $Acc_{17}$ 736, $Acc_{18}$ 738 and $Acc_{19}$ 740). In some embodiments, the first set of accumulators 602 includes the accumulators ($Acc_0$ 702, $Acc_1$ 704, $Acc_2$ 706 and $Acc_3$ 708), and the second set of accumulators 604 includes the accumulators ($Acc_4$ 710, $Acc_5$ 712, $Acc_6$ 714, $Acc_7$ 716, $Acc_8$ 718, $Acc_9$ 720, $Acc_{10}$ 722, $Acc_{11}$ 724, $Acc_{12}$ 726, $Acc_{13}$ 728, $Acc_{14}$ 730, $Acc_{15}$ 732, $Acc_{16}$ 734, $Acc_{17}$ 736, $Acc_{18}$ 738 and $Acc_{19}$ 740).

The accumulators ($Acc_0$ 702, $Acc_1$ 704, $Acc_2$ 706, $Acc_3$ 708) are coupled to receive input 701 that includes the following pixels ($p_{m0}$, $p_{m1}$, $p_{m2}$ and $p_{m3}$) from the current input matrix (input matrices of pixels 106).

The output from the accumulator $Acc_0$ 702 is an output 750, which is $d_{m0}$. The output from the accumulator $Acc_1$ 704 is an output 752, which is $d_{m1}$. The output from the accumulator $Acc_2$ 706 is an output 754, which is $d_{m2}$. The output from the accumulator $Acc_3$ 708 is an output 756, which is $d_{m3}$.

The output 750 ($d_{m0}$) is input into the accumulator $Acc_4$ 710, the accumulator $Acc_5$ 712, the accumulator $Acc_6$ 714 and the accumulator $Acc_7$ 716. The output 752 ($d_{m1}$) is input into the accumulator $Acc_8$ 718, the accumulator $Acc_9$ 720, the accumulator $Acc_{10}$ 722 and the accumulator $Acc_{11}$ 724. The output 754 ($d_{m2}$) is input into the accumulator $Acc_{12}$ 726, the accumulator $Acc_{13}$ 728, the accumulator $Acc_{14}$ 730 and the accumulator $Acc_{15}$ 732. The output 756 ($d_{m3}$) is input into the accumulator $Acc_{16}$ 734, the accumulator $Acc_{17}$ 736, the accumulator $Acc_{18}$ 738 and the accumulator $Acc_{19}$ 740.

The output from the accumulator $Acc_4$ 710 is an output 758, which is $c_{00}$. The output from the accumulator $Acc_5$ 712 is an output 760, which is $c_{10}$. The output from the accumulator $Acc_6$ 714 is an output 762, which is $c_{20}$. The output from the accumulator $Acc_7$ 716 is an output 764, which is $c_{30}$.

The output from the accumulator $Acc_8$ 718 is an output 766, which is $c_{01}$. The output from the accumulator $Acc_9$ 720 is an output 768, which is $c_{11}$. The output from the accumulator $Acc_{10}$ 722 is an output 770, which is $c_{12}$. The output from the accumulator $Acc_{11}$ 724 is an output 772, which is $c_{13}$.

The output from the accumulator $Acc_{12}$ 726 is an output 774, which is $c_{02}$. The output from the accumulator $Acc_{13}$ 728 is an output 776, which is $c_{12}$. The output from the accumulator $Acc_{14}$ 730 is an output 778, which is $c_{22}$. The output from the accumulator $Acc_{15}$ 732 is an output 780, which is $c_{32}$.

The output from the accumulator $Acc_{16}$ 734 is an output 782, which is $c_{03}$. The output from the accumulator $Acc_{17}$ 736 is an output 784, which is $c_{13}$. The output from the accumulator $Acc_{18}$ 738 is an output 786, which is $c_{22}$. The output from the accumulator $Acc_{19}$ 740 is an output 788, which is $c_{33}$.

FIG. 8 illustrates a table of the timing of the execution of a transform scheme for video coding by a part of the set of accumulators shown in FIG. 7, according to some embodiments of the invention. In particular, FIG. 8 illustrates a table 800 of the timing of the execution of a transform scheme for video coding by the accumulators ($Acc_0$ 702, $Acc_1$ 704, $Acc_2$ 706, $Acc_3$ 708), according to some embodiments of the invention.

As shown by the table 800, the video coding logic 102 may generate a first row of the D matrix ($d_{0n}$) or ($d_{00}$, $d_{01}$, $d_{02}$, $d_{03}$) after the fourth input $p_{03}$ of the input matrix P (assuming that the pixels from the matrix are received in a raster scan order and four adders are used). Moreover, as further described below, the video coding logic 102 may generate the last row of the D matrix ($d_{3n}$) or ($d_{30}$, $d_{31}$, $d_{32}$, $d_{33}$) one clock cycle after receiving the $16^{th}$ member, $p_{33}$ of the input matrix P. Additionally, in some embodiments, only four accumulators are needed to generate the D matrix. In particular, the four accumulators may complete computation of one row every four inputs and may restart the computing of a subsequent row there after.

Figure 9:
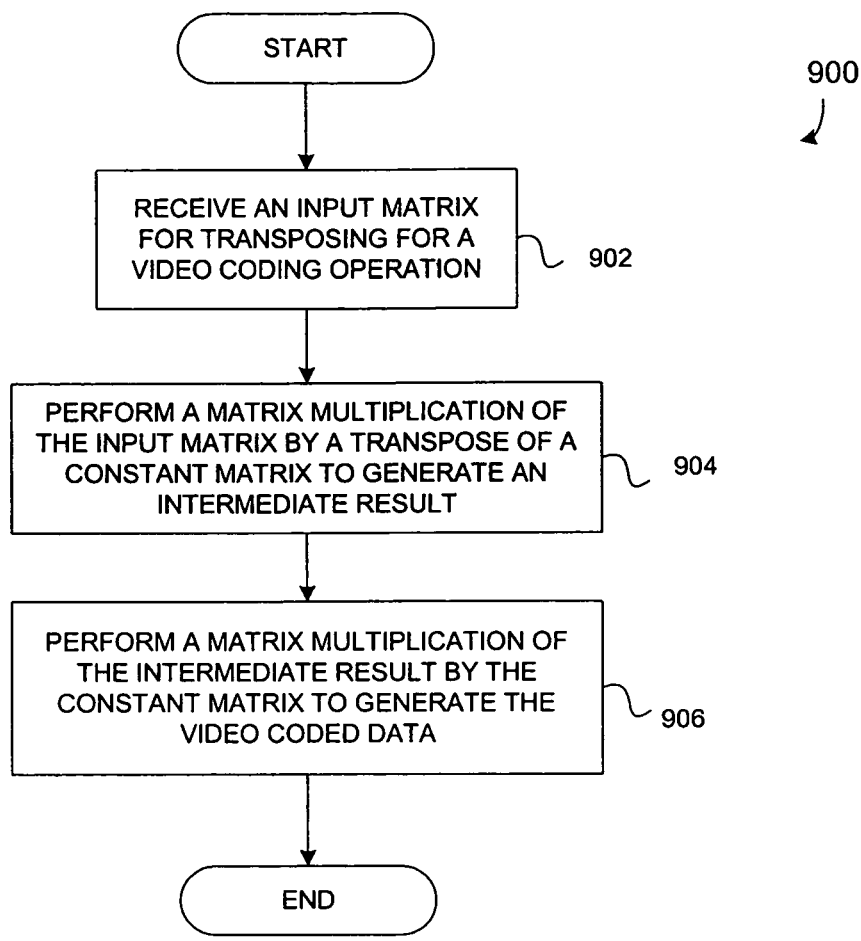
FIG. 9 illustrates a flow diagram for performing a transform scheme without a buffer for video coding, according to some embodiments of the invention.

FIG. 9 illustrates a flow diagram for performing a transform scheme without a buffer for video coding, according to some embodiments of the invention. The flow diagram 900 is described with reference to the components of FIGS. 6-7. The flow diagram 900 commences at block 902.

At block 902, the video coding logic 102 receives an input matrix for transposing for a video coding operation. With reference to FIG. 6, the first set of accumulators 602 receives one of the input matrices of pixels 106. The accumulators ($Acc_0$ 702, $Acc_1$ 704, $Acc_2$ 706 and $Acc_3$ 708) receive the pixels (as shown in FIG. 7). In some embodiments, the pixels are received in a raster scan order. The flow continues at block 904.

At block 904, the video coding logic 102 performs a matrix multiplication of the input matrix by the transpose of a constant matrix to generate an intermediate result. As shown by equation (1) above, the video coding operation includes a matrix multiplication of the input matrix by a constant matrix (A) and by the transpose of the constant matrix ($A^T$). The video coding logic 102 first performs the multiplication of the input matrix by the transpose of the constant matrix because the order of input.

With reference to FIG. 7, the video coding logic 102 may generate the elements of the D matrix using the accumulators ($Acc_0$ 702, $Acc_1$ 704, $Acc_2$ 706 and $Acc_3$ 708). In particular, the accumulators ($Acc_0$ 702, $Acc_1$ 704, $Acc_2$ 706 and $Acc_3$ 708) may generate, respectively, the output 750 ($d_{m0}$), the output 752 ($d_{m1}$), the output 754 ($d_{m2}$) and the output 756 ($d_{m3}$) based on the equations in equation set (7). The flow continues at block 906.

At block 906, the video coding logic 102 performs a matrix multiplication of the intermediate result by the constant matrix to generate the video coded data. With reference to FIG. 7, the second set of accumulators 606 may receive the intermediate result (the D matrix) as a stream of data from the first set of accumulators 602. The second set of accumulators 606 may perform a matrix multiplication of the D matrix by the constant matrix A (using the equation set 8 shown above). With reference to FIG. 7, the video coding logic 102 may generate the elements of the C matrix using the accumulators ($Acc_4$ 710, $Acc_5$ 712, $Acc_6$ 714, $Acc_7$ 716, $Acc_8$ 718, $Acc_9$ 720, $Acc_{10}$ 722, $Acc_{11}$ 724, $Acc_{12}$ 726, $Acc_{13}$ 728, $Acc_{14}$ 730, $Acc_{15}$ 732, $Acc_{16}$ 734, $Acc_{17}$ 736, $Acc_{18}$ 738 and $Acc_{19}$ 740). In particular, the accumulators ($Acc_4$ 710, $Acc_5$ 712, $Acc_6$ 714, $Acc_7$ 716, $Acc_8$ 718, $Acc_9$ 720, $Acc_{10}$ 722, $Acc_{11}$ 724, $Acc_{12}$ 726, $Acc_{13}$ 728, $Acc_{14}$ 730, $Acc_{15}$ 732, $Acc_{16}$ 734, $Acc_{17}$ 736, $Acc_{18}$ 738 and $Acc_{19}$ 740) may generate, respectively, the output 758 ($c_{00}$), the output 760 ($c_{10}$), the output 762 ($c_{20}$), the output 764 ($c_{30}$), the output 766 ($c_{01}$), the output 768 ($c_{11}$), the output 770 ($c_{12}$), the output 772 ($c_{13}$), the output 774 ($c_{02}$), the output 776 ($c_{12}$), the output 778 ($c_{22}$), the output 780 ($c_{32}$), the output 782 ($c_{03}$), the output 784 ($c_{13}$), the output 786 ($c_{23}$) and the output 788 ($c_{33}$) based on the equations in equation set (8). Accordingly, the C matrix is video coded data 108. In contrast to the flow diagram 500, the flow diagram 900 does not store the intermediate result into a storage medium.

Alternative System Architecture

The embodiments shown above illustrate different logic that may perform a transform scheme for video coding. Such logic may be hardware, software or a combination thereof. Another configuration wherein software performs the transform scheme for video coding as described herein is now described.

Figure 10:
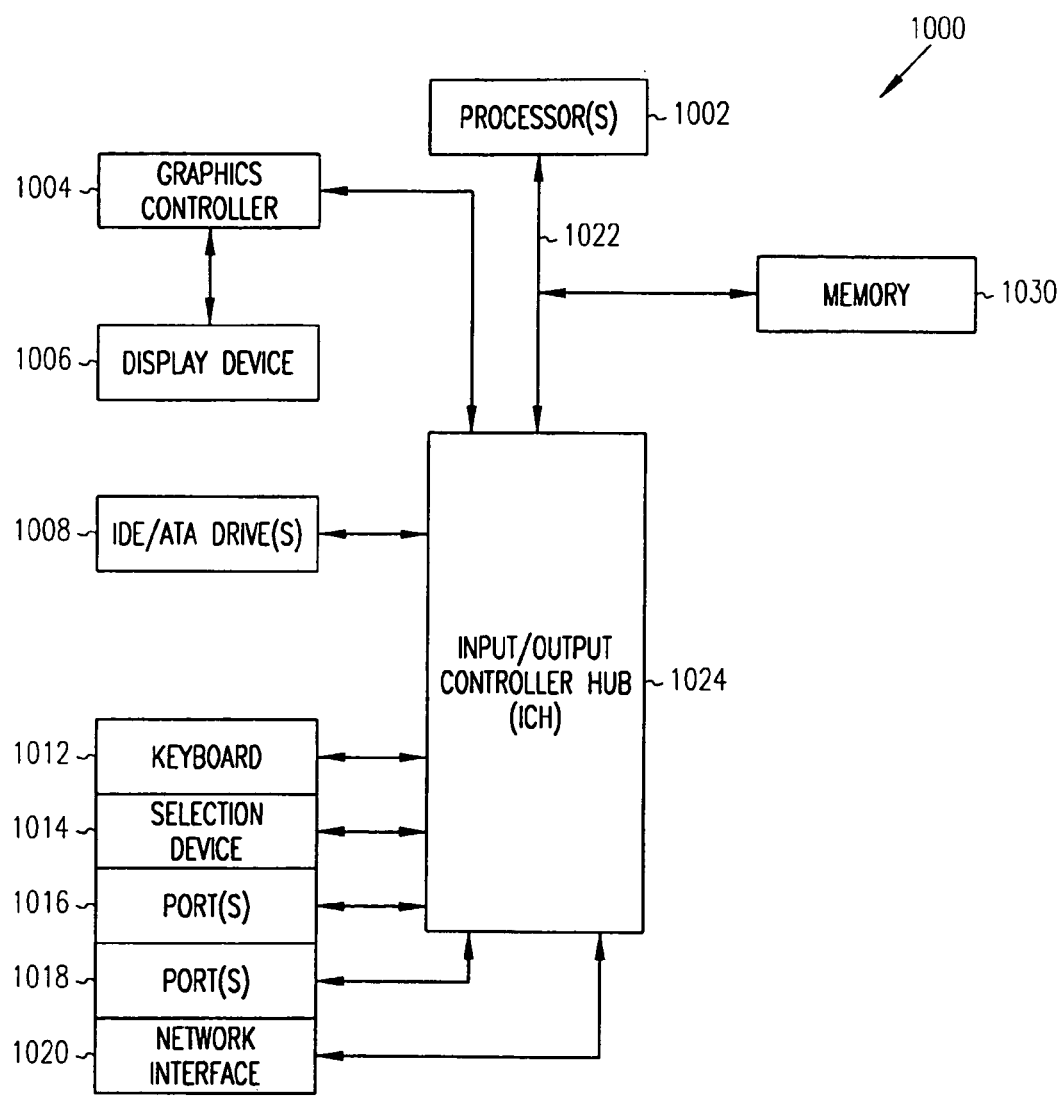
FIG. 10 illustrates a computer device that executes software for performing a transform scheme for video coding, according to some embodiments of the invention.

FIG. 10 illustrates a computer device that executes software for performing a transform scheme for video coding, according to some embodiments of the invention. As illustrated in FIG. 10, a computer device 1000 comprises processor(s) 1002. The computer device 1000 also includes a memory 1030, a processor bus 1022, and an input/output controller hub (ICH) 1024. The processor(s) 1002, the memory 1030, and the ICH 1042 are coupled to the processor bus 1022. The processor(s) 1002 may comprise any suitable processor architecture. The computer device 1000 may comprise one, two, three, or more processors, any of which may execute a set of instructions in accordance with some embodiments of the invention.

The memory 1030 stores data and/or instructions, and may comprise any suitable memory, such as a random access memory (RAM). For example, the memory 1030 may be a Static RAM (SRAM), a Synchronous Dynamic RAM (SDRAM), DRAM, a double data rate (DDR) Synchronous Dynamic RAM (SDRAM), etc. A graphics controller 1004 controls the display of information on a display device 1006, according to an embodiment of the invention.

The ICH 1024 provides an interface to Input/Output (I/O) devices or peripheral components for the computer device 1000. The ICH 1024 may comprise any suitable interface controller to provide for any suitable communication link to the processor(s) 1002, the memory 1030 and/or to any suitable device or component in communication with the ICH 1024. For an embodiment of the invention, the ICH 1024 provides suitable arbitration and buffering for each interface.

In some embodiments, the ICH 1024 provides an interface to one or more suitable Integrated Drive Electronics (IDE)/Advanced Technology Attachment (ATA) drive(s) 1008, such as a hard disk drive (HDD). In an embodiment, the ICH 1024 also provides an interface to a keyboard 1012, a mouse 1014, one or more suitable devices through ports 1016-1018 (such as parallel ports, serial ports, Universal Serial Bus (USB), Firewire ports, etc.). In some embodiments, the ICH 1024 also provides a network interface 1020 though which the computer device 1000 may communicate with other computers and/or devices.

With reference to FIGS. 1 and 2, the memory 1030 and/or one of the IDE/ATA drives 1008 may be representative of the storage medium 104 or the storage medium 204. In some embodiments, the video coding logic 102 may be instructions executing within the processor(s) 1002. Therefore, the video coding logic 102 may be stored in a machine-readable medium that are a set of instructions (e.g., software) embodying any one, or all, of the methodologies described herein. For example, the video coding logic 102 may reside, completely or at least partially, within the memory 1030, the processor(s) 1002, one of the IDE/ATA drive(s) 1008, etc.

In the description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that embodiments of the invention may be practiced without such specific details. In other instances, control structures, gate level circuits and full software instruction sequences have not been shown in detail in order not to obscure the embodiments of the invention. Those of ordinary skill in the art, with the included descriptions will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention include features, methods or processes that may be embodied within machine-executable instructions provided by a machine-readable medium. A machine-readable medium includes any mechanism which provides (i.e., stores and/or transmits) information in a form accessible by a machine (e.g., a computer, a network device, a personal digital assistant, manufacturing tool, any device with a set of one or more processors, etc.). In an exemplary embodiment, a machine-readable medium includes volatile and/or non-volatile media (e.g., read only memory (ROM), random access memory (RAM), magnetic disk storage media, optical storage media, flash memory devices, etc.), as well as electrical, optical, acoustical or other form of propagated signals (e.g., carrier waves, infrared signals, digital signals, etc.)).

Such instructions are utilized to cause a general or special purpose processor, programmed with the instructions, to perform methods or processes of the embodiments of the invention. Alternatively, the features or operations of embodiments of the invention are performed by specific hardware components which contain hard-wired logic for performing the operations, or by any combination of programmed data processing components and specific hardware components. Embodiments of the invention include software, data processing hardware, data processing system-implemented methods, and various processing operations, further described herein.

A number of figures show block diagrams of systems and apparatus for a transform scheme for a video coding operation, in accordance with embodiments of the invention. A number of figures show flow diagrams illustrating a transform scheme for a video coding operation, according to some embodiments of the invention. The operations of the flow diagrams will be described with references to the systems/apparatus shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

In view of the wide variety of permutations to the embodiments described herein, this detailed description is intended to be illustrative only, and should not be taken as limiting the scope of the invention. What is claimed as the invention, therefore, is all such modifications as may come within the scope and spirit of the following claims and equivalents thereto. Therefore, the specification and drawings are to be regarded in an illustrative rather than a restrictive sense.

What is claimed is:

1. A method executable by one or more processors, the method comprising:
   receiving at least a part of an input matrix of pixels of a video stream in a raster scan order;
   performing a first matrix multiplication operation of the at least the part of the input matrix of pixels by a transpose of a constant matrix to generate an intermediate result, wherein the first matrix multiplication operation is performed on the at least the part of the input matrix of pixels in the raster scan order; and
   performing a second matrix multiplication operation of the intermediate result by the constant matrix.

2. The method of claim 1, further comprising storing the intermediate result into a buffer prior to performing the second matrix multiplication operation.

3. The method of claim 1, wherein performing the first matrix multiplication operation and performing the second matrix multiplication operation is part of a video coding operation.

4. The method of claim 3, wherein the video coding operation comprises a Motion Picture Experts Group-4-based operation.

5. A machine-readable medium that provides instructions which, when executed by a machine, cause said machine to perform operations of claim 1.

6. A system comprising:
   a first set of accumulators to receive an input matrix of video pixels in a raster scan order and to commence a first matrix multiplication operation on a first row of the input matrix of video pixels with a transpose of a constant matrix, prior to receipt of an element of a second row of the input matrix; and
   a second set of accumulators to commence a second matrix multiplication operation of a result of the first matrix operation with the constant matrix, independent of a buffer for storage of the result of the first matrix operation.

7. The system of claim 6, wherein the first set of accumulators are to commence the first matrix multiplication operation after a last member of a first row of the input matrix is received.

8. The system of claim 6, wherein the video coding logic is to encode the multimedia stream based an Advanced Video Coding standard.

9. The system of claim 6, further comprising a Static Random Access Memory (SRAM), wherein the second set of accumulators are to store a result of the second matrix multiplication operation in the SRAM.

10. The method of claim 1, wherein the at least part of an input matrix of pixels includes a first row of the input matrix and wherein a multiplication of the first row of the input matrix by a first column of the transpose of the constant matrix is initiated prior to receiving a value of a second row of the input matrix.

11. The method of claim 1, wherein the at least a part of an input matrix of pixels comprises a row of pixels in a matrix and wherein performing a first matrix multiplication operation includes;
   storing an addition of a first pixel in the row and a last pixel in the row in a first accumulator;
   storing an addition of a second pixel in the row and a third pixel in the row in a second accumulator;
   storing a subtraction of a last pixel in the row from a first pixel in the row in a third accumulator; and
   storing a subtraction of a third pixel in the row from a second pixel in the row in a fourth accumulator.

12. The method of claim 11 and further comprising determining a row of the intermediate result using the first accumulator, the second accumulator, the third accumulator and the fourth accumulator.

13. The system of claim 6, wherein the input matrix includes a row of pixels and wherein the first set of accumulators include:
   a first accumulator to store an addition of a first pixel in the row and the last pixel in the row;
   a second accumulator to store an addition of a second pixel in the row and a third pixel in the row;
   a third accumulator to store a subtraction of a last pixel in the row from a first pixel in the row; and
   a fourth accumulator to store a subtraction of a third pixel in the row from a second pixel in the row.

* * * * *